United States Patent
Serener-Thielmann et al.

(10) Patent No.: US 8,221,106 B2
(45) Date of Patent: Jul. 17, 2012

(54) VENTING DEVICE FOR MOLD

(75) Inventors: Tayfun Serener-Thielmann, Wiesbaden (DE); Boris Klaus Peter Nitsch, Alzenau (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 58 days.

(21) Appl. No.: 12/906,198

(22) Filed: Oct. 18, 2010

(65) Prior Publication Data

US 2011/0142976 A1 Jun. 16, 2011

Related U.S. Application Data

(60) Provisional application No. 61/286,143, filed on Dec. 14, 2009.

(51) Int. Cl.
*B29C 33/10* (2006.01)
(52) U.S. Cl. .......... 425/28.1; 425/472; 425/812
(58) Field of Classification Search .......... 425/28.1, 425/470, 472, 812; 249/141
See application file for complete search history.

(56) References Cited

U.S. PATENT DOCUMENTS

| 4,795,331 A * | 1/1989 | Cain et al. ............... 425/812 |
| 5,922,237 A | 7/1999 | Green ..................... 249/141 |
| 5,939,101 A * | 8/1999 | Green ..................... 425/812 |
| 6,561,779 B2 * | 5/2003 | Nitsch et al. ............. 425/812 |
| 7,125,511 B2 * | 10/2006 | Serener-Thielmann ...... 425/812 |
| 7,896,643 B2 * | 3/2011 | Serener-Thielmann ...... 425/812 |

FOREIGN PATENT DOCUMENTS

| EP | 1375105 A2 | 1/2004 |
| KR | 100855209 B1 | 9/2008 |
| WO | 2007/139523 A1 | 12/2007 |

OTHER PUBLICATIONS

European Search Report, dated Mar. 23, 2011.

* cited by examiner

*Primary Examiner* — James Mackey
(74) *Attorney, Agent, or Firm* — June E. Rickey

(57) ABSTRACT

A mold blocking member is described for use in a vent bore of a mold for the manufacture of rubber products. The mold blocking member has a tubular hollow body having a first end and a second end. The second end is preferably chamfered for easy insertion into the mold. The first end has a spring element positioned thereon. A cap is affixed to a flat portion of the spring element. The bottom surface of the cap may optionally include channels.

4 Claims, 2 Drawing Sheets

VENTING DEVICE FOR MOLD

CROSS REFERENCE TO OTHER APPLICATIONS

This application claims the benefit of and incorporates by reference U.S. Provisional Application No. 61/286,143 filed Dec. 14, 2009.

FIELD OF THE INVENTION

The invention relates to a blocking member for vent bores in molds for the manufacture of rubber products such as tires. More particularly, the invention is directed to a mold which is equipped with one or more such blocking members.

BACKGROUND OF THE INVENTION

There are generally two types of molds used in the production of rubber articles, such as tires. The first type is the ventless type wherein the mold gasses are vented through tiny cracks in the mold surfaces. The second type of mold is the vented type which comprises a plurality of venting bores in which pins or other devices are inserted to block the flow of rubber while venting the mold. The blocking devices allow the air and mold gasses to vent while preventing the flow of rubber. Without the blocking devices, tiny spues or rubber shoots form on the surface of the article resulting in a hedge hog or bristled appearance. Prior art blocking devices may stop the formation of these rubber shoots, but may result in marks on the surface of the tire. Thus it is desired to have an improved blocking device which allows the gasses to be vented without the formation of rubber shoots and without marks being formed on the tires.

SUMMARY OF THE INVENTION

The invention provides in a first aspect a mold blocking member for use in a vent bore of a mold for the manufacture of rubber products. The mold blocking member has a tubular hollow body having a first end and a second end. The second end is preferably chamfered for easy insertion into the mold. The first end has a spring element positioned thereon. A cap is affixed to a flat portion of the spring element. The bottom surface of the cap may optionally include channels.

BRIEF DESCRIPTION OF THE DRAWINGS

The invention will be described by way of example and with reference to the accompanying drawings in which.

DETAILED DESCRIPTION OF THE INVENTION

Figure 1:
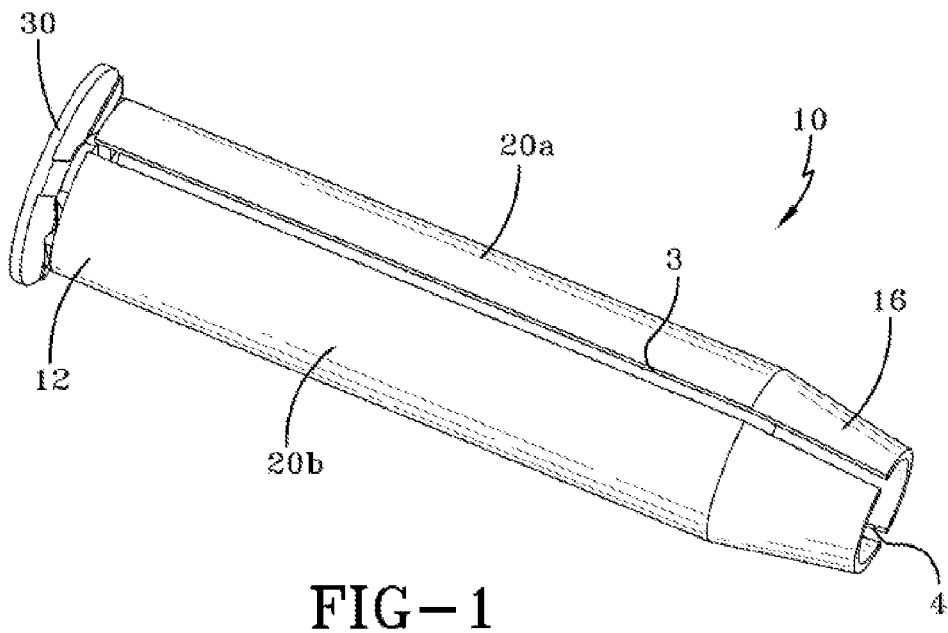
FIG. 1 is a side view of a blocking device of the present invention.

FIG. 1 illustrates a blocking member 10 of the present invention. The blocking member 10 comprises a hollow, central body 20 having a first end 12 and a second end 16. The central body 20 is preferably tapered from a first end 12 to a second end 16. The central body 20 may further comprise optional barbs (not shown) which extend like fins from the hollow body and function to secure the blocking device in the vent bores to prevent pullout during demolding.

The central body 20 may be formed of two halves 20A, 20B which are divided by longitudinal openings 3, 4. The openings provide the central body free mobility in the radial direction during insertion of the device into a mold vent bore (not shown). The central body may be round or slightly oval to ensure a tight fit within a bore of a mold. The openings 3, 4 close as the blocking device is inserted into the mold vent bores.

The blocking member 10 is preferably formed from a thin sheet of metal stock, and may be formed from stamping or punching the metal and then bending the metal into the desired profile. Preferably the blocking member is formed from nickel chromium metal. The diameter of the blocking member is about 2.5 to about 3 mm.

Figure 2:
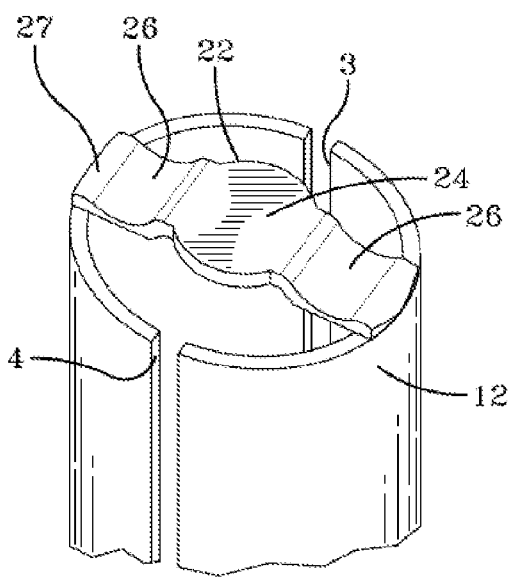
FIG. 2 is a partial front perspective view of the blocking device FIG. 1.
Figure 3:
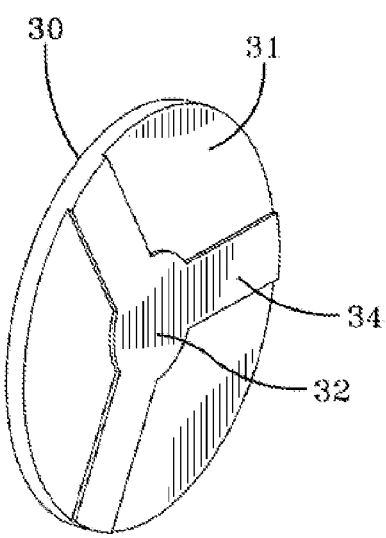
FIG. 3 is a view of the end cap of the blocking device.
Figure 4:
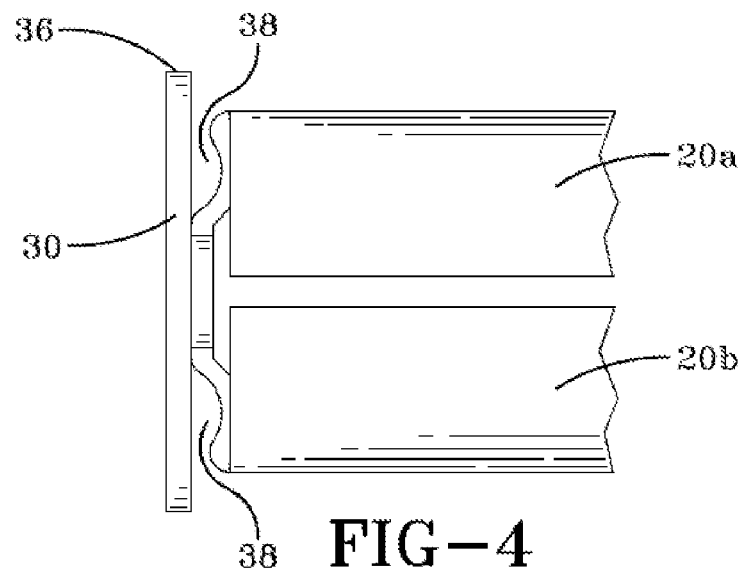
FIG. 4 illustrates the end cap and spring element of the blocking device.
Figure 5:
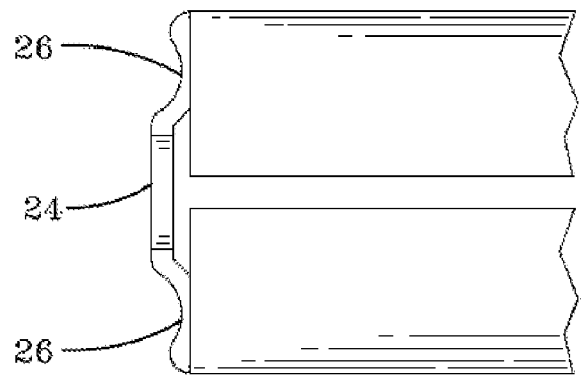
FIG. 5 illustrates the spring element mounted on the blocking device with the end cap removed.
Figure 6:
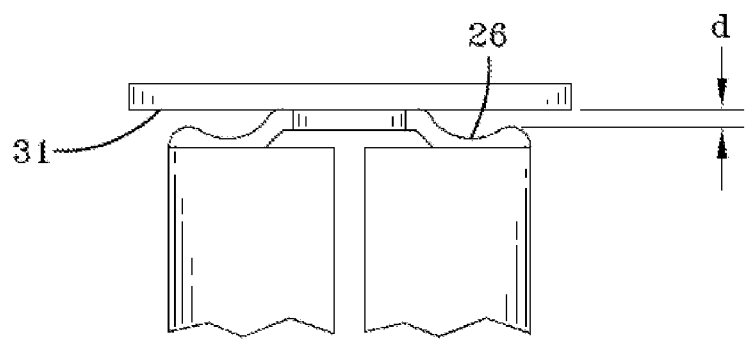
FIG. 6 illustrates the cap and upper portion of the blocking device.

The first end of the blocking member 10 further includes a spring element 22 mounted thereon. The spring element has a flat inner portion 24. The spring element 22 further comprises one or more wavy ends 26. The wavy ends have a flanged portion 27 for connecting to the tubular end of the first end of the blocking member 10. The flanged portion 27 may be welded or otherwise affixed to the tubular end of the blocking member. As shown in FIG. 2, the flat portion of the spring element extends radially outward of the tubular first end.

Mounted upon the flat surface of the spring element is a cap 30. The cap 30 has a larger diameter than the diameter of the body 20. The inner surface 31 of the cap has a flat circular portion 32 which is affixed to the flat portion 24 of the spring element. The inner surface of the cap may optionally include one or more channels 34 on the bottom surface to guide the gas flow from the mold device. A slot opening is formed between the cap and the first end of the tubular body. The distance from the inner or bottom surface 31 of the cap 30 to the leg 26 defines a distance d which may range from about 0.03 mm to about 0.2 mm and more preferably in the range of 0.03 mm to about 0.15 mm.

The blocking member 10 is inserted into a bore of a mold until the lower surface of the cap touches the mold surface. The cap springs back after insertion due to the spring element. An air flow channel is created between the gap of the lower surface of the cap and the tubular end of the body. As shown in FIG. 1, the trapped mold gasses must travel 90 degrees down the sidewalls 36 of the cap 30 and then bend another 90 degrees into air flow channel 38. The air flow channel is annular. The double bend of the flow path acts as a labyrinth in order to block the rubber from flowing past the cap.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold blocking member for use in a vent bore of a mold for the manufacture of rubber products, the mold blocking member comprising: a tubular hollow body having a first end having an outer rim area and a second end, the mold blocking member further comprising a spring element having a flat portion and one or more wavy legs, wherein the wavy legs of the spring element are affixed to the outer rim area of the first end of the tubular hollow body, the mold blocking member further comprising a cap having an inner surface affixed to the flat portion of the spring element.

2. The mold blocking member of claim 1 wherein a slot opening is formed between the cap and the first end of the tubular body, wherein the slot opening has a minimum dimension in the range of about 0.03 mm to about 0.15 mm.

3. The mold blocking member of claim 1 wherein the spring element is not disposed within the tubular hollow body.

4. The mold blocking member of claim 1 wherein the cap has a larger diameter than the diameter of the tubular hollow body.

\* \* \* \* \*